United States Patent [19]
Onodaka et al.

[11] Patent Number: 5,552,568
[45] Date of Patent: Sep. 3, 1996

[54] DISPLAY-INTEGRATED TABLET DEVICE PROVIDING COORDINATE DETECTION

[75] Inventors: Koji Onodaka; Katsuya Hiraga; Yoichi Kobori; Satoshi Nagasawa, all of Mobara, Japan

[73] Assignee: Futaba Denshi Kogyo K.K., Mobara, Japan

[21] Appl. No.: 297,540

[22] Filed: Aug. 31, 1994

[30] Foreign Application Priority Data

Aug. 31, 1993 [JP] Japan .................................. 5-237165

[51] Int. Cl.⁶ .......................... G08C 21/00; G09G 3/02
[52] U.S. Cl. ............................. 178/19; 178/18; 178/20; 345/156; 345/157; 345/174; 345/179; 345/182; 345/183
[58] Field of Search ................................. 178/18, 19, 20; 345/174, 179, 182, 156, 157, 183

[56] References Cited

U.S. PATENT DOCUMENTS

| | | | |
|---|---|---|---|
| 4,740,660 | 6/1988 | Kimura | 178/19 |
| 4,758,690 | 7/1988 | Kimura | 178/19 |
| 4,788,385 | 11/1988 | Kimura | 178/19 |
| 4,818,826 | 4/1989 | Kimura | 198/19 |
| 4,841,290 | 6/1989 | Nakano | 345/182 |
| 4,872,000 | 10/1989 | Kano | 345/182 |
| 4,890,096 | 12/1989 | Taguchi | 178/19 |
| 4,902,858 | 2/1990 | Yamanami | 178/19 |
| 4,980,518 | 12/1990 | Kobayashi | 345/177 |
| 5,070,325 | 12/1991 | Tanaka | 178/18 |

*Primary Examiner*—Stephen Chin
*Assistant Examiner*—Vijay Shankar
*Attorney, Agent, or Firm*—Oblon, Spivak, McClelland, Maier, & Neustadt, P.C.

[57] ABSTRACT

A display-integrated tablet device is disclosed and is capable of increasing an actual display period to improve luminance of an image displayed. An actual image display period in a one-image-plane display period is divided into a plurality of block display periods and a detection period is provided before or after each of the block display periods. During the detection period, a pulse for detection is generated from a stylus pen and a voltage obtained at each of electrodes is input to each of X- and Y-coordinate detection sections and held in those sections for coordinate detection. The device includes scan-side switch sections for respectively connecting X- and Y-scan drivers to X- and Y-electrodes, and detection-side switch sections for respectively connecting X- and Y-coordinate detection sections to the X- and Y-electrodes, so that the scan-side switches sections and detection-side switch sections are turned on and turned off during an actual display period, and turned off and turned on during a detection mode period, respectively.

5 Claims, 11 Drawing Sheets

FIG.3(f) CLK

FIG. 4(a) SYNCHRONOUS SIGNAL
FIG. 4(b) Y-ELECTRODE
FIG. 4(c) X-ELECTRODE
FIG. 4(d) PULSE OUTPUT FOR DETECTION
FIG. 4(e) ANODE ELECTRODE

DISPLAY-INTEGRATED TABLET DEVICE PROVIDING COORDINATE DETECTION

BACKGROUND OF THE INVENTION

1. Field of the Invention

This invention relates to a display-integrated tablet device, and more particularly to a device in which a display and a tablet capable of carrying out coordinate input are integrated with each other.

2. Description of the Prior Art

Figure 9:
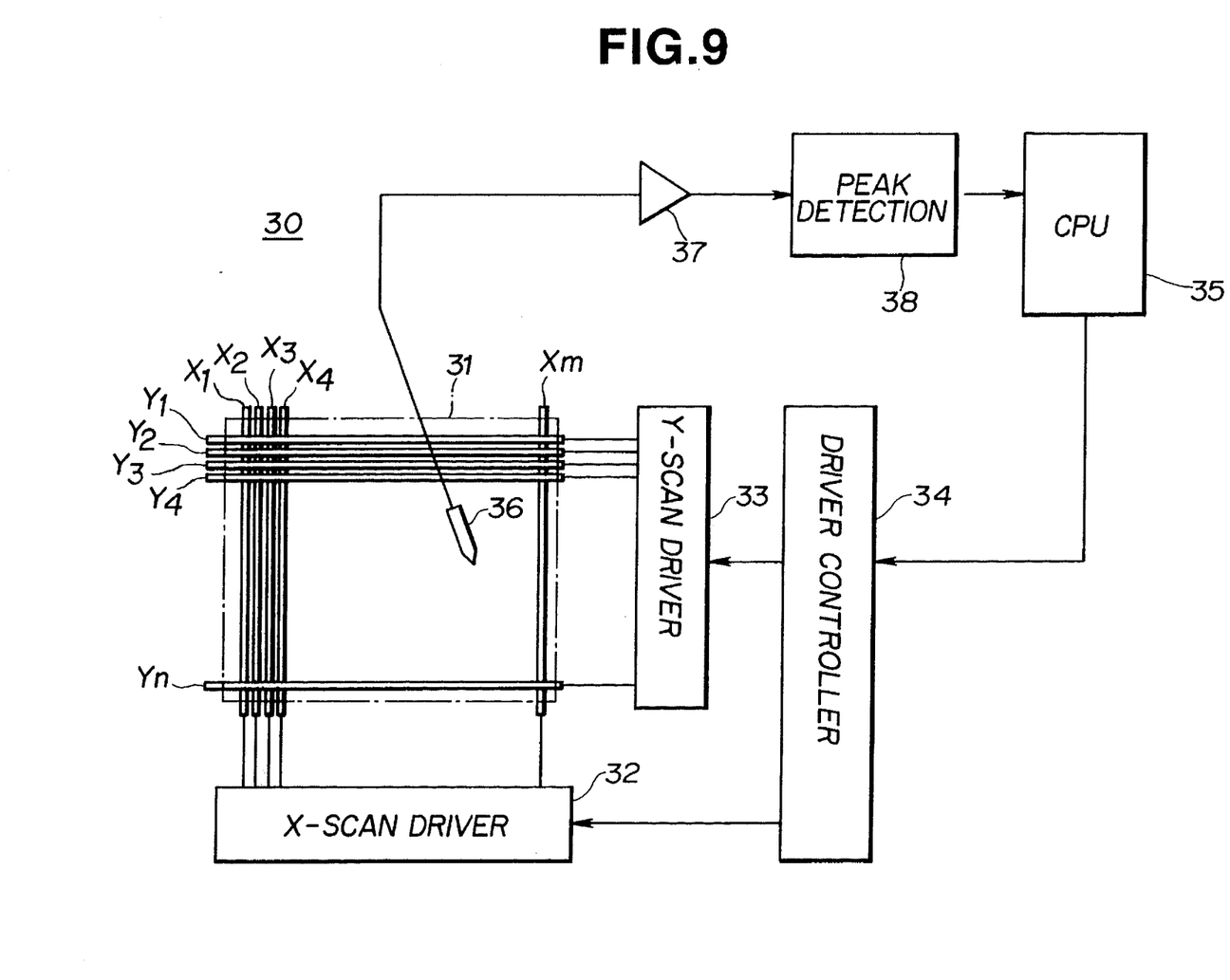
FIG. 9 is a block circuit diagram showing a conventional display-integrated tablet device.

A conventional display-integrated tablet device is generally constructed in such a manner as shown in FIG. 9. More specifically, a conventional display-integrated tablet device generally designated by reference numeral 30 in FIG. 9 includes a matrix tablet (hereinafter merely referred to as "tablet") 31 which comprises a thin film electric luminescence (EL) matrix tablet. The tablet 31 includes X-electrodes $x_1$ to $x_m$ arranged in a column direction for carrying out horizontal scanning and Y-electrodes $Y_1$ to $Y_n$ arranged in a row direction for carrying out vertical scanning, so that the X-electrodes and Y-electrodes cooperate with each other to form a matrix.

The X-electrodes $x_1$ to $x_m$ each are connected to a X-scanning driver 32, which functions to apply a scan voltage to the X-electrodes $x_1$ to $x_m$ at a predetermined timing according to control by a driver controller 34. The Y-electrodes $y_1$ to $y_n$ are commonly connected to a Y-scan driver 33, which likewise applies a scan voltage to the Y-electrodes $y_1$ to $y_m$ at a predetermined timing according to control by the driver controller 34.

The display-integrated tablet device 30 also includes a CPU 35 for carrying out image display scan control, as well as carrying out detection operation of an input coordinate indicated through a stylus pen 36 based on a peak detection signal at a predetermined timing as described hereinafter.

The stylus pen 36 includes a distal end or pen point for detection, which is adapted to be abutted against the tablet to carry out coordinate input according to an electrostatic capacity coupling system. Reference numeral 37 designates an amplifier for amplifying a coordinate detection signal output from the stylus pen 36 and 38 is a peak detection section for carrying out peak detection with respect to the coordinate detection signal fed from the stylus pen 36 through the amplifier 37, to thereby feed a coordinate position at which a peak of the signal is detected to the CPU 35.

Now, display operation and coordinate input operation carried out by the conventional display-integrated tablet device 30 thus constructed will be described hereinafter with reference to FIGS. 10(a) to 10(l) and FIG. 11.

FIGS. 10(a) to 10(l) each show a waveform of a timing at which scanning of each of the X-electrodes $x_1$ to $x_m$ and Y-electrodes $y_1$ to $y_n$ of the tablet 31 is executed by each of the X-scan driver 32 and Y-scan driver 33. As shown in FIG. 10, supposing that a period during which display for one picture plane is carried out and a period during which a pen input position is detected are defined to be a one-image-plane display period corresponding to one frame or one field period, the period is separated into a display period during which display operation is actually carried out and Y- and X-coordinate detection periods.

Figures 10A, 10L:
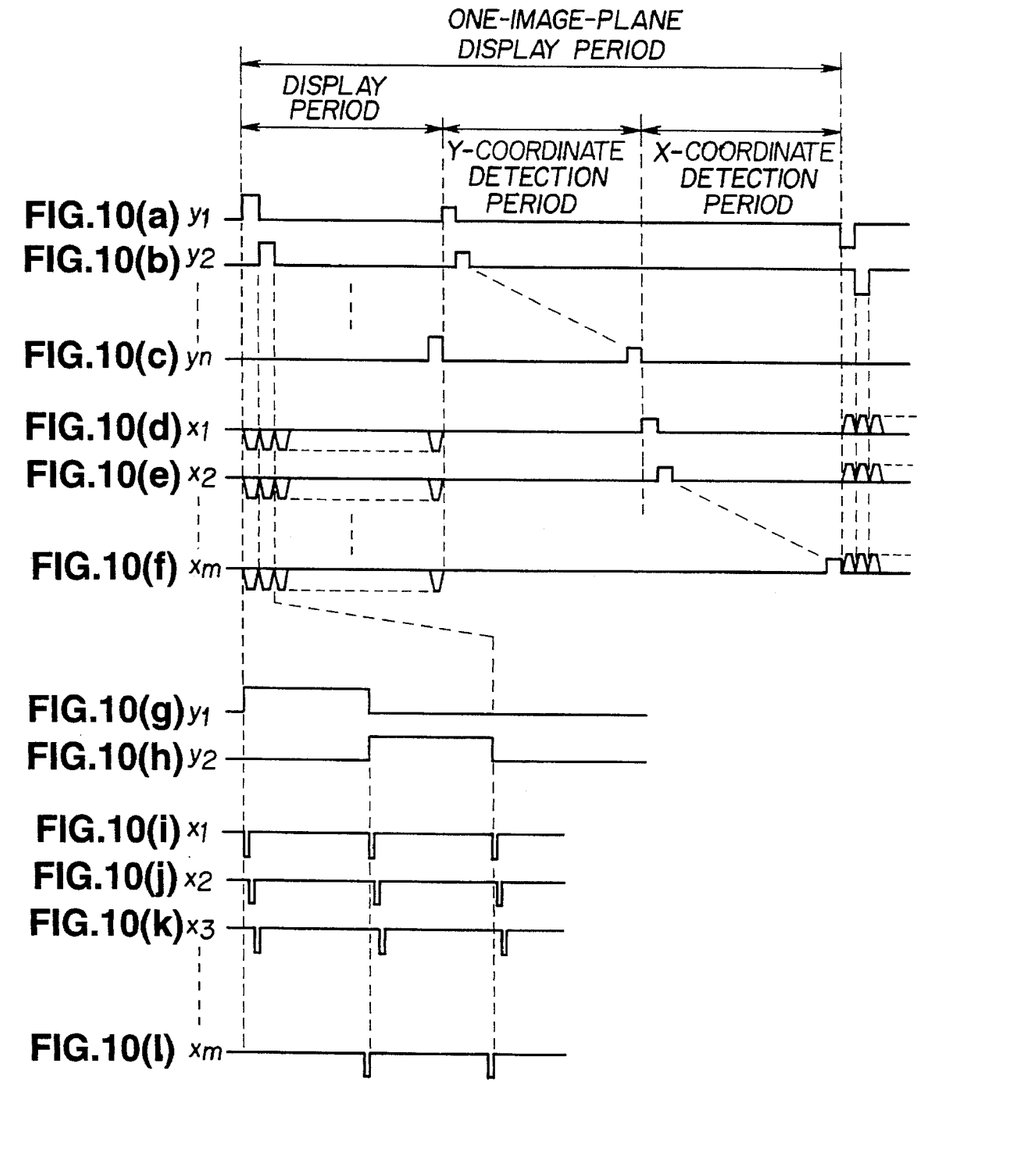

During the display period, the Y-scan driver 33 applies a scan voltage to the Y-electrodes $y_1$ to $y_n$ in turn as shown in FIGS. 10(a) to 10(c), to thereby execute vertical scanning. More specifically, application of the voltage to the Y-electrodes $y_1$ to $y_n$ is carried out by one line for every one time depending on a vertical/horizontal synchronous signal. The X-scan driver 32 applies a voltage to the X-electrodes $x_1$ to $x_m$ within a scan period of each of the Y-electrodes $y_1$ to $y_n$ depending on display data fed thereto from the driver controller 34 as shown in FIGS. 10(d) to 10(f). More specifically, the X-scan driver 32 applies the voltage to the X-electrodes corresponding to display cells in the Y-electrodes (horizontal lines) in turn.

Therefore, during scanning of each of the Y-electrodes, a phosphor of each of picture cells intersecting the X-electrodes having a voltage applied thereto is excited for luminescence due to formation of an electric field by the X-electrodes and Y-electrodes, resulting in display operation being carried out.

FIGS. 10(g) to 10(l) each enlargedly show a scan timing of the X-electrodes $x_1$ to $x_m$ while enlarging a scan period of the Y electrodes $y_1$ and $Y_2$.

When such a display period terminates, operation for a Y-coordinate detection period takes places. An X-coordinate detection period following the Y-coordinate detection period is defined for detecting coordinate input due to abutment of the stylus pen 36 against the tablet 31.

First, during the Y-coordinate detection period, only the Y-scan driver 33 applies a detection voltage to the Y-electrodes $y_1$ to $y_n$ in turn as shown in FIGS. 10(a) to 10(c). Therefore, when the pen point of the stylus pen 36 is kept abutted against a location on the tablet 31, electrostatic capacity coupling occurs between the Y-electrode positioned in proximity to the location and the stylus pen 36, so that a voltage is output in the form of a coordinate detection signal from the stylus pen 36.

Also, during the X-coordinate detection period, only the X-scan driver 32 applies a detection voltage to the X-electrodes $x_1$ to $x_m$ in turn as shown in FIGS. 10(d) to 10(f) Thus, when the pen point of the stylus pen 36 is kept abutted against a location on the tablet 31, electrostatic capacity coupling occurs between the X-electrode positioned in proximity to the location and the stylus pen 36, resulting in a voltage being output in the form of a coordinate detection signal from the stylus pen 36.

Figure 11:
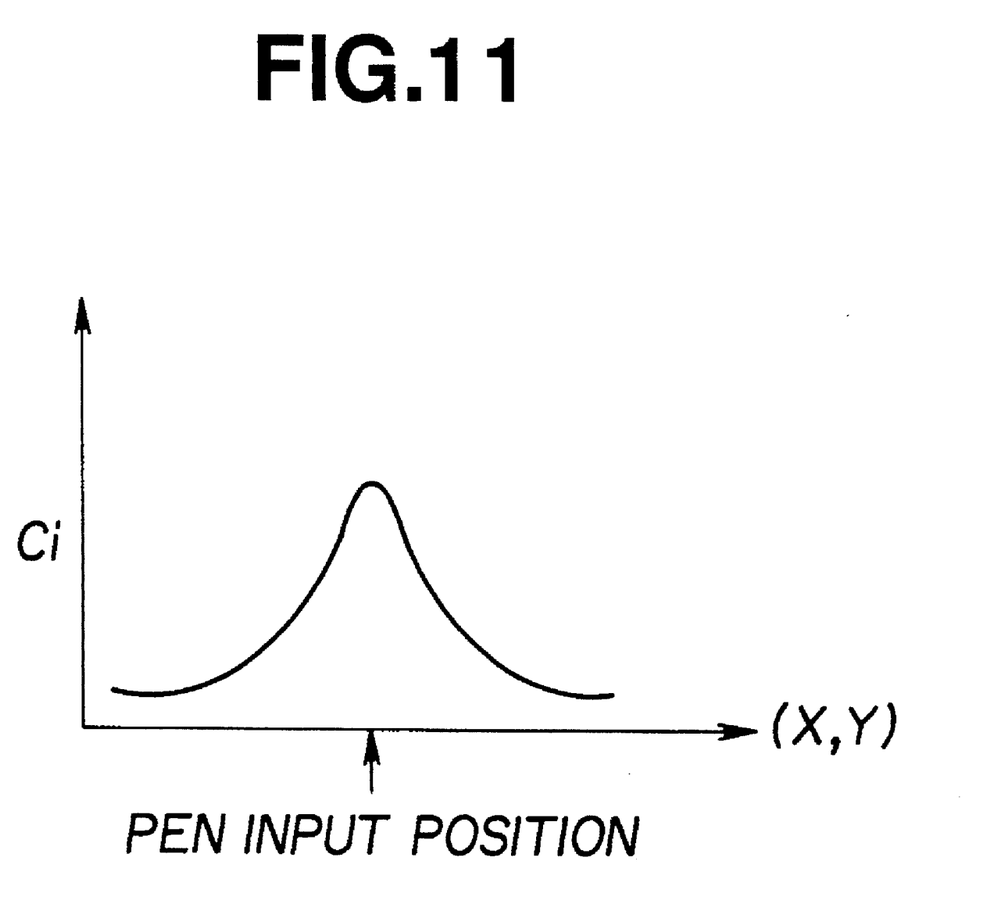
FIG. 11 is a graphical representation showing a voltage distribution due to electrostatic capacity coupling.

FIG. 11 is a graphical representation showing a voltage distribution due to electrostatic capacity coupling, wherein an abscissa axis indicates a location in an X-direction or a Y-direction and an ordinate axis indicates electrostatic capacity. As shown in FIG. 11, the electrostatic capacity is distributed in the form of a curved shape with respect to a location on the tablet 31 against which the stylus pen 36 is abutted. Therefore, during a period of scanning of an X-electrode (or Y-electrode) adjacent to a certain Y-electrode (or X-electrode), the stylus pen 36 generates a voltage along the curve shown in FIG. 11.

In view of the above, supposing that the coordinate detection signal shown in FIG. 11 is fed from the stylus pen 36 through the amplifier 37 to the peak detection circuit 38, for example, during scanning of a certain Y-electrode, the peak detection circuit 38 detects a peak position of the coordinate detection signal by means of a comparator or the like employing, for example, a voltage as a reference and feeds a peak position signal to the CPU 35 upon the detection.

Then, the CPU 35 discriminates the Y-electrode being scanned during a period corresponding to a timing at which the peak position signal is fed, resulting in the Y-electrode at the location at which the stylus pen 36 is abutted against the table 31 or the Y-coordinate being discriminated.

This is likewise applied to Y-coordinate detection. More particularly, during the X-coordinate detection period, a scan voltage is applied to the X-electrodes $x_1$ to $x_m$ in turn for detection of an X-coordinate, to thereby obtain such a detection signal as shown in FIG. 11, resulting in a peak position signal of the voltage being fed to the CPU 35.

Thus, detection of a Y-coordinate as an input position is carried out during the Y-coordinate detection period and detection of an X-coordinate as an input position likewise takes place during the X-coordinate detection period, so that inputting of the X-coordinate and Y-coordinate by the stylus pen 36 is carried out.

In the conventional display-integrated tablet device constructed as described above, it is required to carry out both image display and coordinate detection by means of the same tablet, so that the one-image-plane display period is required to be divided into the actual display period and the X-coordinate detection period and Y-coordinate detection period, as shown in FIGS. 10(a) to 10(l).

Also, during the detection period, a pulse-like scan voltage of tens to hundreds of volts is applied to the X-electrodes and Y-electrodes in turn, so that the scan pulse is required to have a pulse width as long as several microseconds for every electrode. This causes a period of time required for detection during the one-image-plane display period or a period corresponding to display interruption to be considerably increased, so that the actual display period is reduced correspondingly.

Normally, in such display, the one-image-plane display period is defined to be about 1/60 to 1/70 second (about 16.7 to 14.2 ms). For example, supposing that sixty Y-electrodes and eighty X-electrodes are scanned at a pulse width of 5 μs for detection in turn by means of a high speed driver, detection of the X-coordinate and Y-coordinate requires a period as long as (60×5)+(80×5)=700 μs (0.7 ms), so that a period of time required for detection of the X-coordinate and Y-coordinate accounts for a considerable percentage of the one-image-plane display period.

Such a decrease in percentage for which the actual display period accounts of the one-image-plane display period causes an image displayed to be darkened.

Also, when the stylus pen 36 is used for not pointing but letter or character recognition, it is required that movement of the stylus pen 36 at a suitable speed on the tablet 31 for coordinate detection is carried out at least for every 1/120 second (about 8.3 ms) in view of detection accuracy. Thus, when coordinate detection during the one-image-plane display period takes place, for example, twice or more, the display period is decreased because a relationship between the pulse width and the number of electrodes scanned does not permit the coordinate detection period to be decreased, so that the displayed image may be further darkened to a degree sufficient not to be put to practical use.

SUMMARY OF THE INVENTION

The present invention has been made in view of the foregoing disadvantages of the prior art.

Accordingly, it is an object of the present invention to provide a display-integrated tablet device which is capable of significantly increasing an actual display period, to thereby improve luminance of an image displayed.

It is another object of the present invention to provide a display-integrated tablet device which is capable of preventing a wrong coordinate from being detected.

It is a further object of the present invention to provide a display-integrated tablet device which is capable of improving coordinate detection accuracy required for character recognition.

In accordance with the present invention, a display-integrated tablet device is provided. The tablet device includes a tablet having a plurality of X-electrodes and Y-electrodes arranged in a matrix-like manner and including a display plane, an X-electrode drive means for driving the X-electrodes at a predetermined timing, a Y-electrode drive means for driving the Y-electrodes at a predetermined timing, a coordinate input means for permitting a signal for coordinate detection to be output to any position on the tablet, an X-coordinate detection signal holding means connected to the X-electrodes and arranged so as to temporarily hold, for each of the X-electrodes, the signal output from the coordinate input means, a Y-coordinate detection signal holding means connected to the Y-electrodes and arranged so as to temporarily hold, for each of the Y-electrodes, the signal output from the coordinate input means, a coordinate detection means to which a voltage value for every electrode held in each of the X-coordinate detection signal holding means and Y-coordinate detection signal holding means is input, resulting in detection of each of an X-coordinate and a Y-coordinate being carried out on the basis of a peak position of the voltage value, and a control means for controlling the X-electrode drive means and Y-electrode drive means during an image display period so as to permit an image display to be carried out on the display plane of the tablet and permitting the coordinate input means to output a signal for the coordinate detection during a coordinate detection period, resulting in X-Y coordinate data being detected through the coordinate detection means.

In a preferred embodiment of the present invention, the display plane of the tablet is divided into two or more display regions, in correspondence to which block display periods are set and a detection mode period is set before or after each of the block display periods.

In a preferred embodiment of the present invention, the device also includes a switching means which permits said X-electrodes and Y-electrodes to be connected to said X-electrode drive means and Y-electrode drive means during said image display period and said X-coordinate detection means and Y-coordinate detection means during said coordinate detection period, respectively.

BRIEF DESCRIPTION OF THE PREFERRED EMBODIMENTS

These and other objects and many of the attendant advantages of the present invention will be readily appreciated as the same becomes better understood by reference to the following detailed description when considered in connection with the accompanying drawings; wherein:

FIGS. 3(a) to 3(f) each are a timing chart showing operation of the Y-coordinate detection section;

FIGS. 10(a) to 10(l) each are a timing chart showing an electrode scan timing in the conventional display-integrated tablet device of FIG. 9.

DETAILED DESCRIPTION OF THE PREFERRED EMBODIMENT

Now, a display-integrated tablet device according to the present invention will be described hereinafter with reference to an embodiment thereof illustrated in FIGS. 1 to 8, wherein a display having a field emission cathode is incorporated is used. Thus, the following description will be first made on a display of the field emission type.

Application of an electric field of about $10^9$ (V/m) to a surface of a metal or semiconductor material leads to a tunnel effect, which permits electrons to pass through a barrier, resulting in the electrons being discharged to a vacuum even at a normal temperature. Such a phenomenon is referred to as "field emission" and a cathode constructed so as to emit electrons based on such a principle is referred to as "field emission cathode".

Recently, semiconductor processing techniques permit a field emission cathode (hereinafter also referred to "FEC") of the surface discharge type to be formed of FEC arrays of a size as small as microns.

Figure 7A:
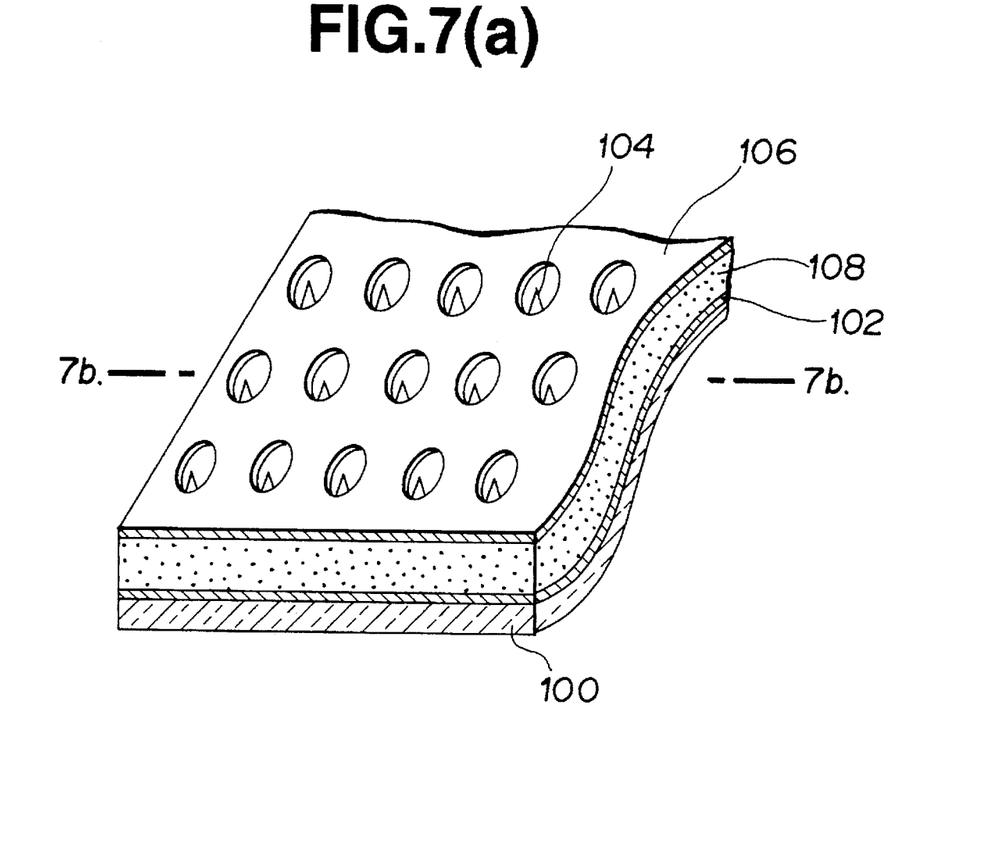
FIG. 7(a) is a perspective view showing a Spindt-type field emission cathode which may be incorporated in the display-integrated tablet device of FIG. 1.
Figure 7B:
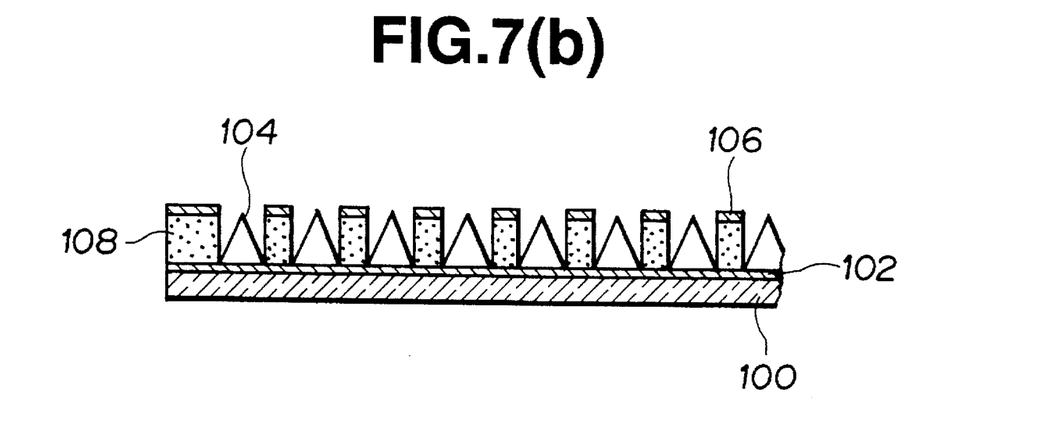
FIG. 7(b) is a sectional view of the field emission cathode shown in FIG. 7(a)

FIGS. 7(a) and 7(b) show a Spindt-type FEC which is one example of the FEC of the surface discharge type. FIG. 7(a) is a perspective view of the FEC prepared by the semiconductor processing techniques and FIG. 7(b) is a sectional view taken along line A—A of FIG. 7(a). The FEC, as shown in FIGS. 7(a) and 7(b), includes a substrate 100, on which a cathode electrode 102 made of a metal material such as aluminum or the like is provided. The cathode electrode 102 is provided thereon with emitters 104 of a conical shape. The cathode electrode 102 is also provided thereon with a gate electrode 106 through a film 108 made of $SiO_2$. The conical emitters 104 are positioned in apertures formed through the gate electrode 106, so that the emitters 104 each are exposed at a distal end thereof from each of the apertures of the gate electrode 106.

The conical emitters 104 may be arranged so as to be spaced from each other at pitches as small as 10 microns, so that ten thousands to hundred thousands of such FECs may be formed on a single single substrate. Also, the semiconductor processing techniques permit a distance between the gate electrode 106 and the distal end of each of the emitters 104 to be set to be as small as submicrons, so that application of a voltage as low as tens of volts between the gate electrode 106 and the cathode electrode 102 may permit the emitters to field-emit electrons.

The FEC is formed into a flat shape, resulting in acting as a field emission cathode of the surface discharge type, which may be used for constructing a display device of the field emission type (hereinafter referred to as "FED" or "field emission display"). For example, a combination of such an FED with an input means for coordinate detection such as a stylus pen permits coordinate detection to be carried out utilizing electrostatic capacity coupling between electrodes of the FED and a conductor for the detection, thus, it will be noted that the FED may be used for construction of a display-integrated tablet device.

Figure 8:
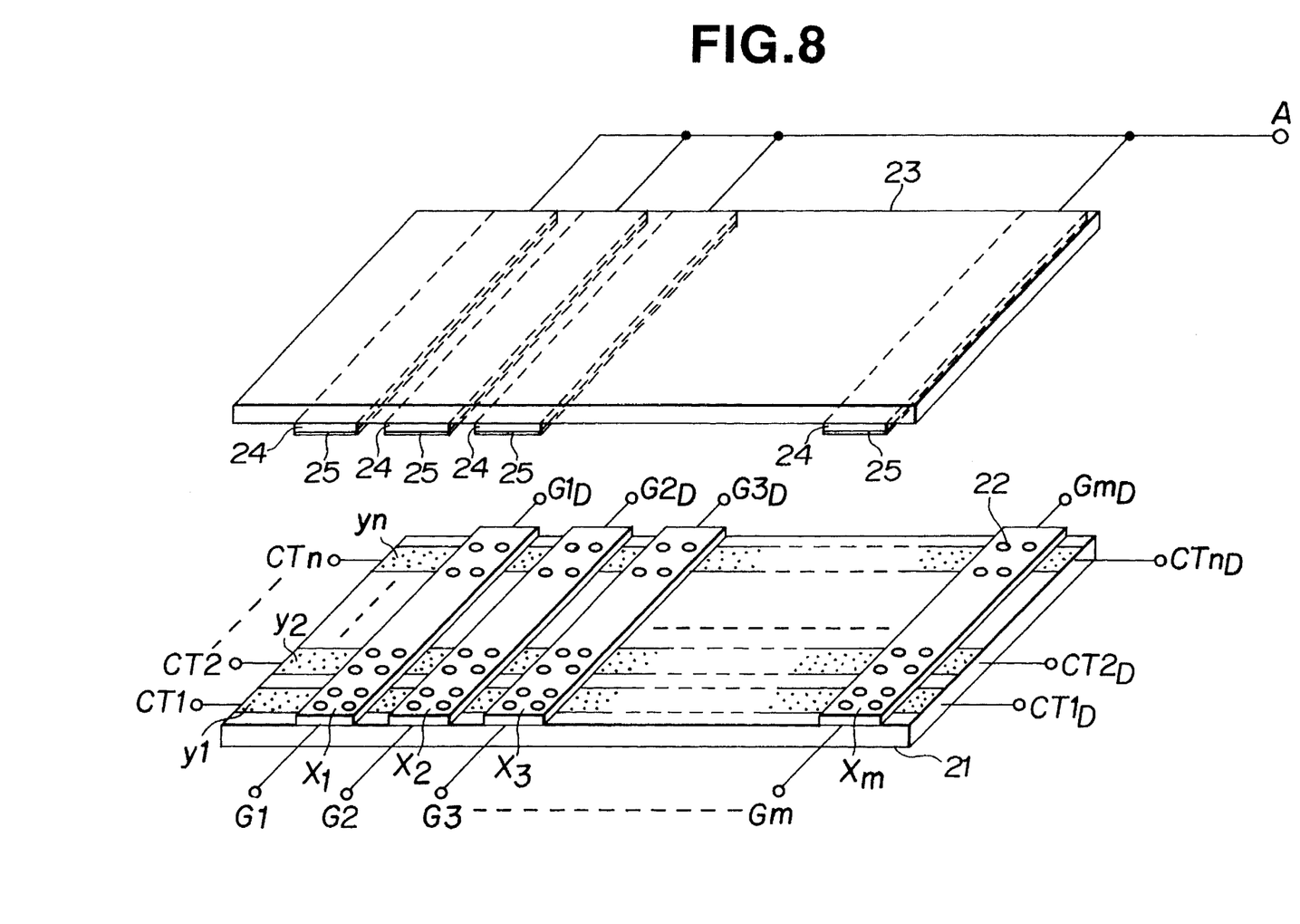
FIG. 8 is a perspective view showing a structure of the display-integrated tablet device shown in FIG. 1.

FIG. 8 shows such an FED as constructed as described above, which may be incorporated as a tablet in the display-integrated tablet device of the illustrated embodiment. The FED or tablet includes a first substrate 21, on which Y-electrodes or cathode electrodes $y_1$ to $y_n$ each formed into a strip-like shape are arranged. The cathode electrodes $y_1$ to $y_n$ are connected to cathode terminals CT1 to CTn to which a drive pulse is fed, as well as to cathode voltage detection terminals $CT1_D$ to $CTn_D$ from which a voltage induced between the stylus pen and the electrodes due to electrostatic capacity coupling is output in the form of a coordinate detection signal, respectively.

The FED also includes X-electrodes or gate electrodes $x_1$ to $x_m$ formed into strip-like shape and arranged on the cathode electrodes $y_1$ to $y_n$ through an insulator in a manner to be perpendicular to the cathode electrodes $y_1$ to $y_n$. The gate electrodes $x_1$ to $x_m$ are connected to gate terminals G1 to Gm to which a drive pulse is fed, as well as to gate voltage detection terminals $G1_D$ to $Gm_D$ from which a coordinate detection signal is output, respectively. The gate electrodes $x_1$ to $x_m$ each are formed with a plurality of apertures 22 through which electrons emitted from conical emitters constructed as shown in FIGS. 7(a) and 7(b) and formed on the cathode electrodes $y_1$ to $y_n$ are outwardly discharged therethrough.

The FED further includes a second substrate 23 arranged opposite to the first substrate 21. The second substrate 23 is formed thereon with anode electrodes 24, which are arranged in a stripe-like manner and so as to positionally correspond to the gate electrodes $x_1$ to $x_m$. The anode electrodes 24 are commonly connected to an anode lead-out electrode A. The anode electrodes 24 each have a phosphor 25 deposited on a surface thereof opposite to each of the gate electrodes $x_1$ to $x_m$. The phosphor 25 is excited due to impingement of electrons thereon.

The above-described elements are encapsulated in a hermetic envelope and the above-described terminals are led out from the envelope, resulting in constructing a display-integrated tablet.

Now, a manner of driving of the FED 1 for image display will be schematically exemplified hereinafter with reference to FIGS. 1 and 8.

The anode electrodes 24 arranged on the second substrate 23 each have a voltage of a substantially constant level applied thereto by the anode lead-out electrode A. The cathode electrodes or Y-electrodes $y_1$ to $y_n$ are fed at the cathode terminals CT1 to $CT_n$ thereof with a scan pulse, to thereby be scanned, resulting in being selected and driven in turn.

The cathode terminals CT1 to CTn are scanned in turn while keeping a positive anode voltage applied to the anode leadout electrode A for driving the anode electrodes 24, during which the gate terminals Gl to Gm each have a voltage applied thereto depending on data on an image signal in synchronism with a timing of scanning of the cathode terminals. This results in picture cells of the phosphors 25 provided on the anode electrodes 24 being excited by electrons emitted from the cathode electrodes $y_1$ to $y_n$ scanned and subject to luminous control depending on the voltage applied to the gate terminals Gl to Gm, thus, one image plane (one field) for an image is displayed.

Now, a display-integrated tablet device in which the FED is incorporated as a tablet will be described hereinafter with reference to FIG. 1.

Figure 1:
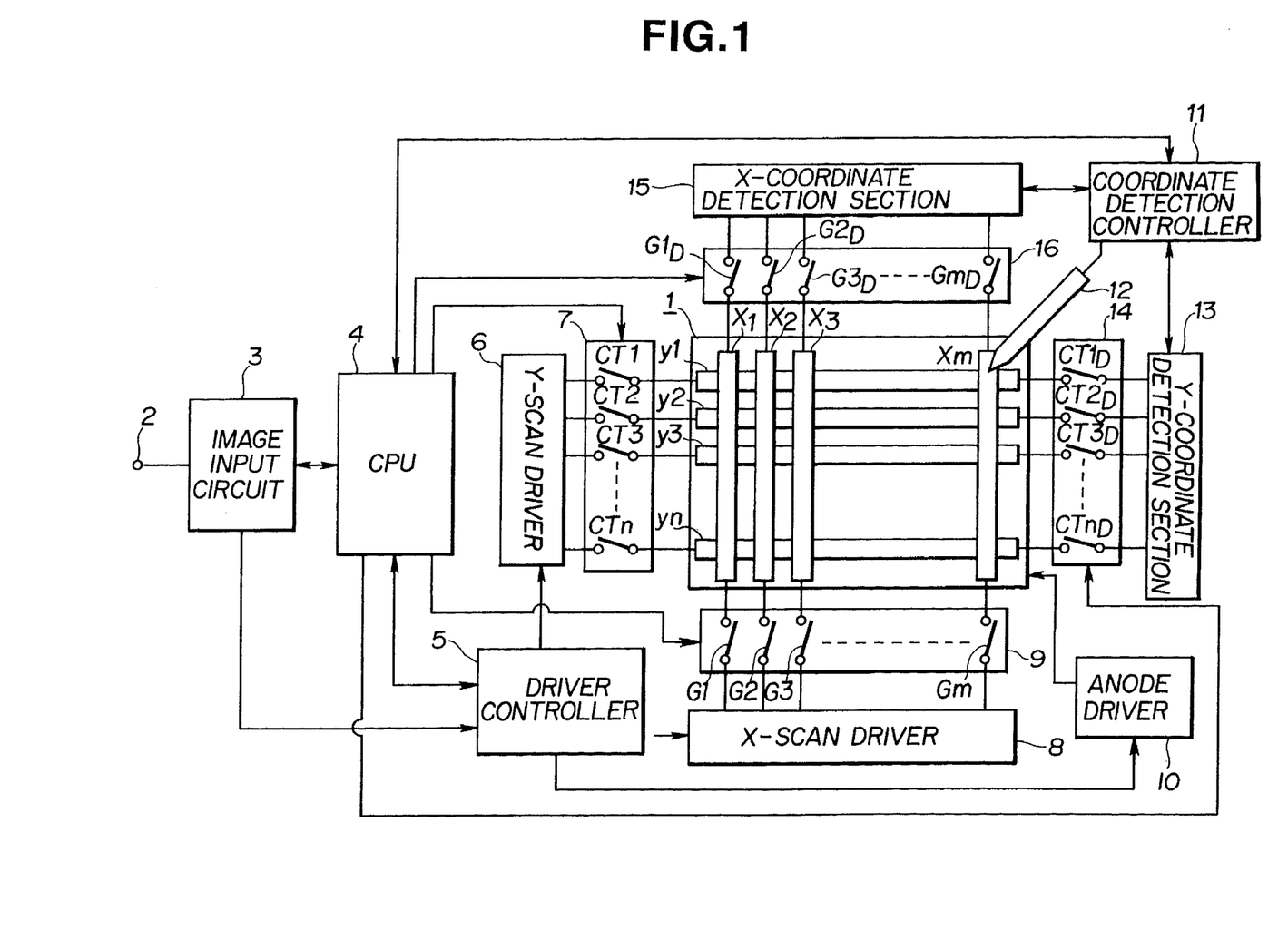
FIG. 1 is a block circuit diagram showing an embodiment of a display-integrated tablet device according to the present invention.

In FIG. 1, reference numeral 1 designates a tablet which comprises an FED constructed in the manner described above with reference to FIG. 8. In FIG. 1, anode electrodes 24, phosphors 25 and an anode lead-out electrode A are not shown for the sake of brevity. The anode electrodes 25 may be arranged on gate electrodes $X_1$ to $x_m$ and the anode lead-out electrode A may be connected to an anode driver 10 described hereinafter.

Reference numeral 2 designates an image input terminal to which an image data signal is fed. 3 is an image input circuit, which functions to transmit, to a CPU 4, data required for control of image display depending on an image data signal fed to the image input terminal 2 and output image data for control of an X-scan driver 8 and a Y-scan driver 6 to a driver controller 5. The CPU 4 functions to carry out control of scanning for image display and processing for input coordinate detection. The driver controller 5 controls a timing of application of a scan voltage by the Y-scan driver 6 and a timing of application of a data voltage corresponding to image data by the X-scan driver 8. Also, the driver controller 5 functions to control a timing of application of a voltage by the anode driver 10.

The Y-scan driver 6 applies a scan voltage to terminals corresponding to the cathode electrodes or Y-electrodes $y_1$ to $y_n$ of a Y-electrode scan switch section 7 at a predetermined timing according to control by the driver controller 5 described above. In the Y-electrode scan switch section 7, the terminals of the Y-scan driver 6 and cathode terminals CT1 to CTn of the Y-electrodes are connected to each other through switches, respectively. The switches are controlled by the CPU 4 so as to be turned on in the lump during an actual display period and turned off in the lump during a detection mode period. During the actual display period, a scan voltage of the tablet 1 is fed from the Y-scan driver 6 through the Y-electrode scan switch section 7 (cathode terminals CT1 to CTn) to the Y-electrodes $y_1$ to $y_n$ in turn.

The X-scan driver 8 functions to apply a voltage corresponding to image data to terminals corresponding to the gate electrodes or X-electrodes $x_1$ to $x_m$ of an X-electrode scan switch section 9 at a predetermined timing according to control by the driver controller 5. In the X-electrode scan switch section 9, the terminals of the X-scan driver 8 and the gate terminals Gl to Gm of the X-electrodes are connected to each other through switches, respectively. The switches are controlled by the CPU 4 in a manner to be turned on in the lump during the actual display period and turned off in the lump during the detection mode period. Thus, during the actual display period, a data voltage is applied from the X-scan driver 8 through the X-electrode scan switch section 9 (gate terminals Gl to Gm) to the X-electrodes at a predetermined timing.

The anode driver 10 is connected to the anode lead-out electrode A of the tablet 1 and functions to generate a positive anode voltage for driving the anode electrodes 24 at a predetermined timing according to control by the driver controller 5.

Reference numeral 11 designates a coordinate detection controller, which functions to control a timing of generation of a detection pulse from a stylus pen 12 and a timing of detection by each of an X-coordinate detection section 15 and a Y-coordinate detection section 13. Also, the coordinate detection controller 11 carries out intake of data on a voltage value for every electrode due to electrostatic capacity coupling from each of the X-coordinate detection section 15 and Y-coordinate detection section 13 to discriminate a coordinate input by the stylus pen 12, to thereby generate coordinate data, which are then transmitted to the CPU 4.

The stylus pen 12 for coordinate input, in the illustrated embodiment, is caused to generate a detection pulse from a detection distal end (pen point) thereof due to control by the coordinate detection controller 11 during the detection mode period detailedly described hereinafter. The stylus pen 12 generates the detection pulse while keeping the detection distal end abutted against the tablet 1, resulting in a voltage for detection being obtained between the X-electrodes and Y-electrodes and the pen point of the stylus pen 12 due to electrostatic capacity coupling.

The Y-coordinate detection section 13 may include a holding circuit for temporarily holding a voltage for every electrode input therein, a peak detection circuit for taking the held voltage values out of the holding circuit in turn to detect a peak position and the like, as described hereinafter. The Y-coordinate detection section 13 functions to input thereto the above-described voltage due to the electrostatic capacity coupling from each of the Y-electrodes through a Y-coordinate detection switch section 14 and temporarily hold it therein to carry out peak position detection, to thereby generate peak detection data, which are then fed to the coordinate detection controller 11. The Y-coordinate detection switch section 14 connects cathode voltage detection terminals $CT1_D$ to $CTn_D$ of the Y-electrodes and input terminals of the Y-coordinate detection section 13 corresponding thereto to each other through switches, respectively. The switches are controlled by the CPU 4 in a manner to be turned on in the lump during the detection mode period detailedly described hereinafter and turned off in the lump during the display period.

The X-coordinate detection section 15 may be constructed in substantially the same manner as the Y-coordinate detection section 13. The X-coordinate detection section 15 operates so as to input a voltage induced due to electrostatic capacity coupling during the detection mode period from each of the X-electrodes through an X-coordinate detection switch section 16 thereto and then temporarily hold it therein, to thereby carry out peak position detection, resulting in generating peak detection data, which are then fed to the coordinate detection controller 11. Also, the X-coordinate detection switch section 16 functions to connect gate voltage detection terminal $Gl_D$ to $Gm_D$ of the X-electrodes and input terminals of the X-coordinate detection section 15 to each other through switches, respectively. The switches are controlled by the CPU 4 so as to be turned on in the lump during the detection mode period and turned off in the lump during the display period.

Figure 2:
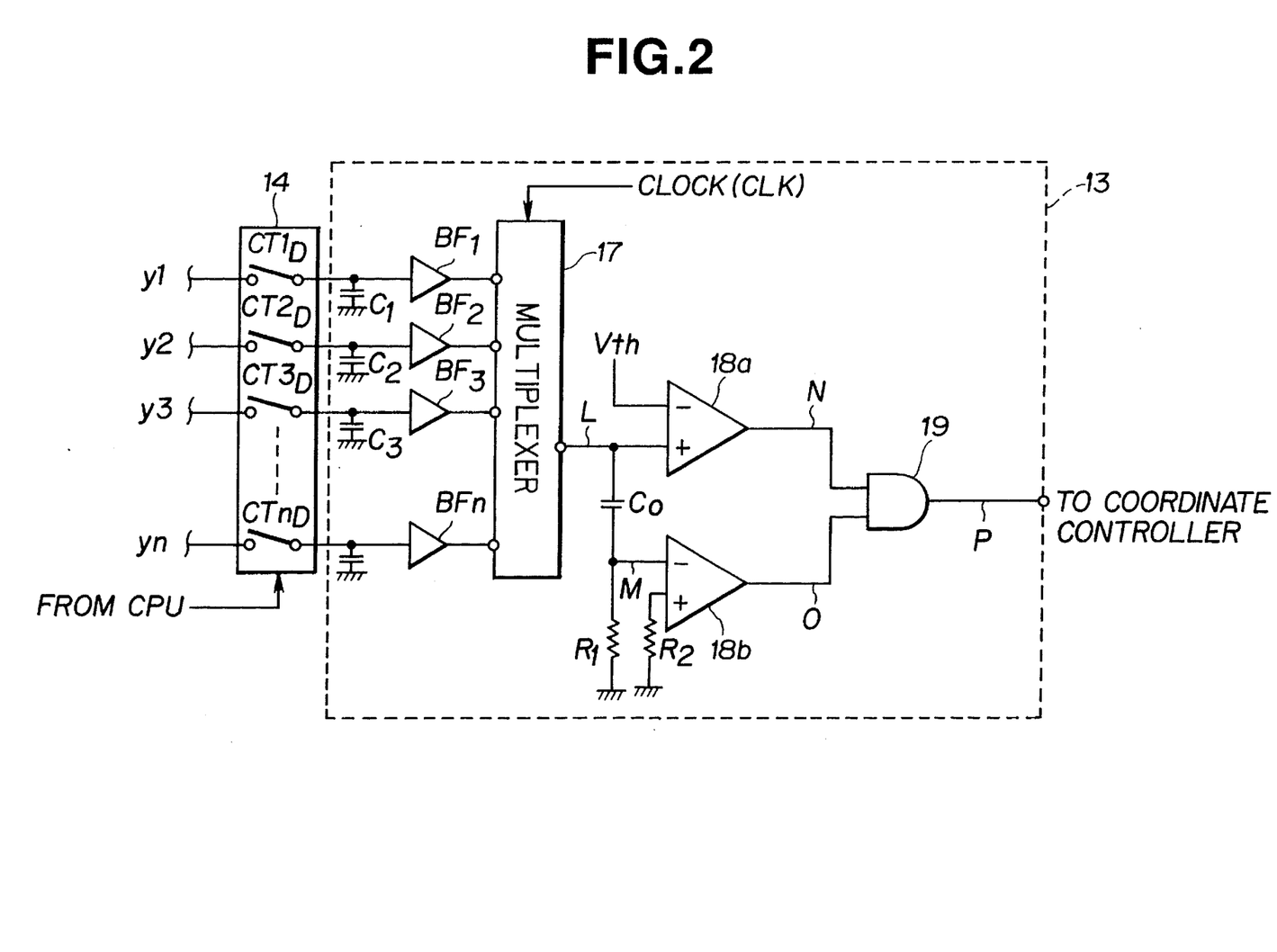
FIG. 2 is a circuit diagram showing an example of a Y-coordinate detection section in the display-integrated tablet device of FIG. 1.

Now, an example of construction of the Y-coordinate detection section 13 will be described hereinafter with reference to FIG. 2. In FIG. 2, the above-described Y-coordinate detection switch section designated by reference numeral 14, as described above, connects the cathode voltage detection terminals $CT1_D$ to $CTn_D$ led out of the Y-electrodes $y_1$ to $y_n$ and the input terminals of the Y-coordinate detection section 13 to each other through the switches, respectively.

In FIG. 2, reference characters $C_1$ to $C_n$ designate capacitors which are arranged in the Y-coordinate detection section 13 indicated at dotted lines and each serve as a holding element for holding voltage input thereto. $BF_1$ to $BF_n$ each are a buffer amplifier and 17 is a multiplexer, which functions to output a voltage for each of the Y-electrodes input thereto in turn at a timing based on a clock CLK fed thereto from the coordinate detection controller 11. $C_0$ is a capacitor, and $R_1$ and $R_2$ each are a resistor. The capacitor $C_0$ and resistor $R_1$ cooperate with each other to form a differentiating circuit. 18a and 18b each are a comparator and 19 is an AND circuit.

Now, the manner of operation of the Y-coordinate detection section 13 will be described hereinafter with reference to FIG. 3. First, when the switches of the Y-coordinate detection switch section 14 are turned on in the lump by the CPU 4, a voltage for coordinate detection generated due to electrostatic capacity coupling is input through each of the switches to the Y-coordinate detection section 13. The voltage thus obtained for every electrode is temporarily held in each of the capacitors $C_1$ to $C_n$.

Then, the multiplexer 17 successively selects the voltage held in each of the capacitors $C_1$ to $C_n$ based on a timing of the clock CLK, followed by outputting of the voltage. For example, first the voltage held in the capacitor $C_1$ is output from the multiplexer 17 through the buffer amplifier $BF_1$ and then the voltage held in the capacitor $C_2$ is likewise output from the multiplexer 17 based on a timing of the next clock CLK. Finally, the voltage held in the capacitor $C_n$ is output from the multiplexer 17.

Figures 3A, 3F:
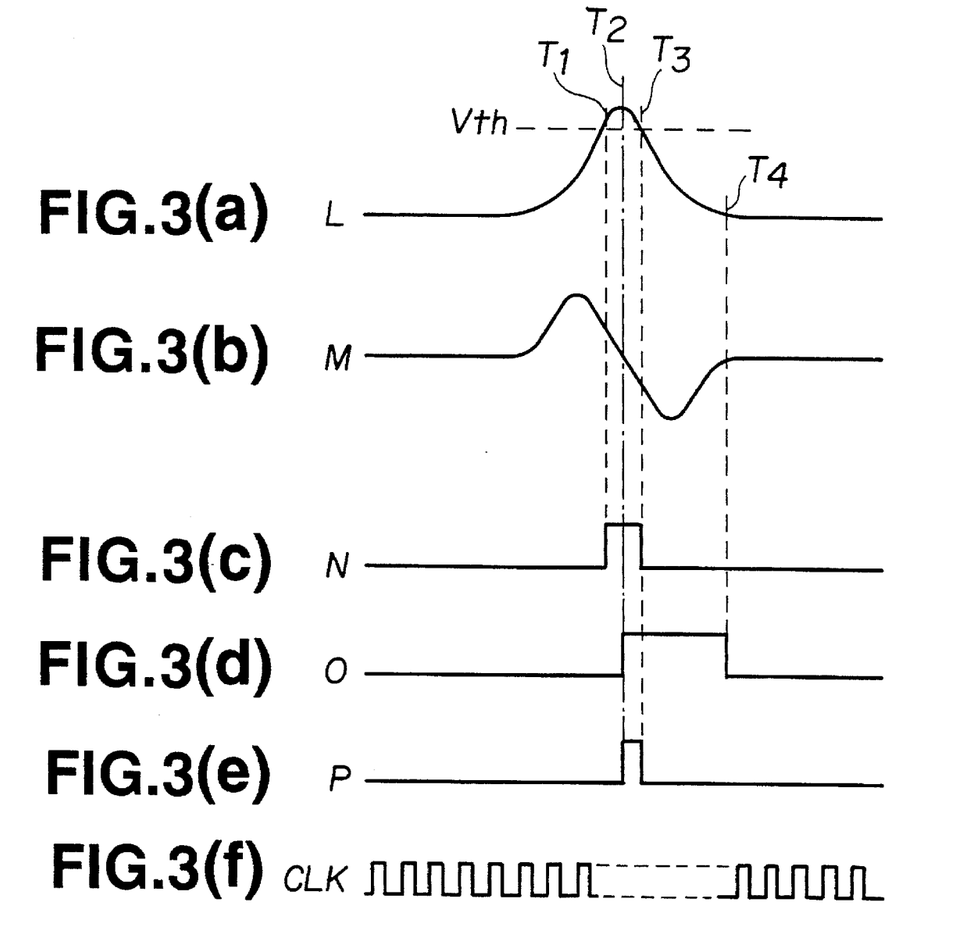

At certain time in a period during which the voltage for every Y-electrode is output from the multiplexer, a voltage of such a waveform as shown in FIG. 3(a) is obtained as an output L of the multiplexer 17 depending on a position of the stylus pen 12 on the tablet. The output L is then fed to a non-inversion input of the comparator 18a and shaped into a signal of a waveform M shown in FIG. 3(b) by the differentiating circuit comprising the capacitor $C_0$ and resistor $R_1$, which signal is then fed to an inversion input of the comparator 18b.

The comparator 18a compares a waveform of the output L input thereto with a threshold level Vth (FIG. 3(a)) input to the inversion input thereof, to thereby output an H level during a period for which the output L exceeds the threshold level, as shown in FIG. 3(c).

The comparator 18b outputs an H level as shown in FIG. 3(d) during a period for which the level is kept negative or the output L falls from its peak to a zero level. Thus, the AND circuit 19 to which the output of each of the comparators 18a and 18b is input outputs a signal P which rises at the time when the output L reaches a peak and has a reduced pulse width, as shown in FIG. 3(e). The coordinate detection controller 11 carries out comparison between the time of input of the signal P and a timing of the clock CLK, to thereby detect the Y-electrode at which a peak of the detected voltage is obtained or the Y-coordinate.

The X-coordinate detection section 15 may be constructed and operated in substantially the same manner as the Y-coordinate detection section 13.

Now, the manner of operation for image display and coordinate detection by the display-integrated tablet device of the illustrated embodiment constructed as described above will be described hereinafter with reference to FIG. 4(a) to 4(e) and FIG. 5, wherein FIGS. 4(a) to 4(e) show a drive timing of each of the X-electrodes $x_1$ to $x_m$ and Y-electrodes $y_1$ to $y_n$ during a one-image-plane display period of the display-integrated tablet and an output timing of a pulse for detection output from the stylus pen 12.

Figure 4A:
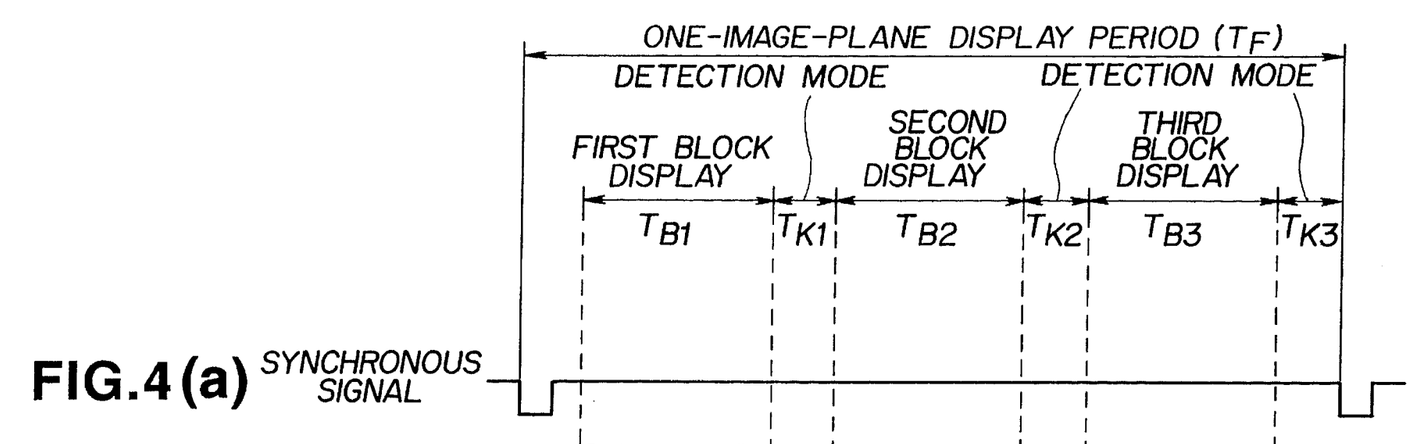
FIGS. 4(a) to 4(e) each are a timing chart showing an example of each of an electrode drive timing and a detection pulse generation timing within a one-image-plane display period in the display-integrated tablet device of FIG. 1.

FIG. 4(a) shows a synchronous signal, wherein a period between each adjacent two synchronous signals is defined to be a one-image-plane display period $T_F$, which corresponds to a one-frame (or one-field) period. For example, the synchronous signal is extracted by image data in the image input circuit 3 and then fed to CPU 4. Then, the CPU 4 controls a scan pulse and a timing of detection operation for image display based on the synchronous signal.

In the illustrated embodiment, in the one-image-plane display period $T_F$, the actual display period is divided into a first block display period $T_{B1}$, a second block display period $T_{B2}$ and a third block display period $T_{B3}$. Also, detection mode periods $T_{K1}$, $T_{K2}$ and $T_{K3}$ corresponding to coordinate input are set immediately after the block display periods, respectively. The first to third blocks referred to herein each indicate a range of each of display regions divided in a direction of the Y-electrodes (scanning lines) on a display plane, as shown in FIG. 5.

First, during the first block display period $T_{B1}$, control by the CPU 4 causes the X-coordinate scan switch 9 and Y-coordinate scan switch 7 to be turned on and the X-coordinate detection switch 16 and Y-coordinate detection switch 14 to be turned off, so that a scan voltage or an image data voltage may be fed from the X-scan driver 8 and Y-scan driver 6 to the X-electrodes and Y-electrodes, respectively.

Also, coordinate detection in the illustrated embodiment causes a voltage induced due to electrostatic capacity coupling to be output toward the detection section. Therefore, when the X-coordinate detection switch 16 and Y-coordinate detection switch 14 are turned off during the display period, a voltage applied from each of the X-scan driver 8 and Y-scan driver 6 is prevented from being input to the X-coordinate detection section and Y-coordinate detection section, resulting in a disadvantage that detection operation takes place while mistaking a display driver voltage for a data voltage for coordinate detection being effectively prevented.

Figure 4B:
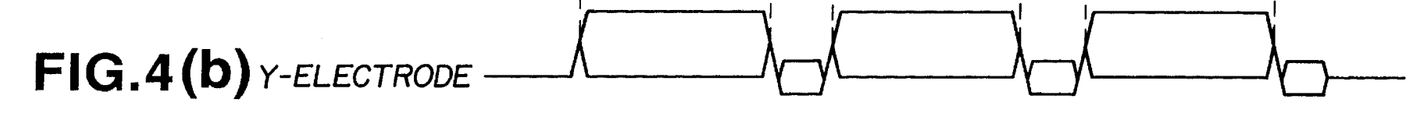
Figure 4C:
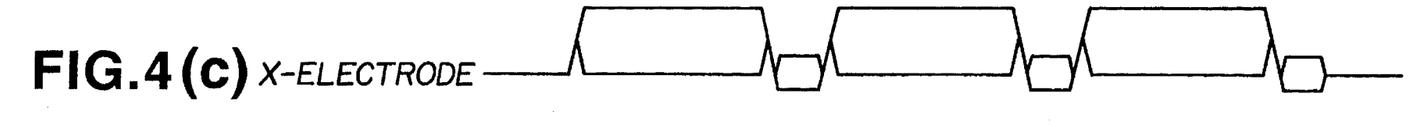
Figures 4D, 4E:
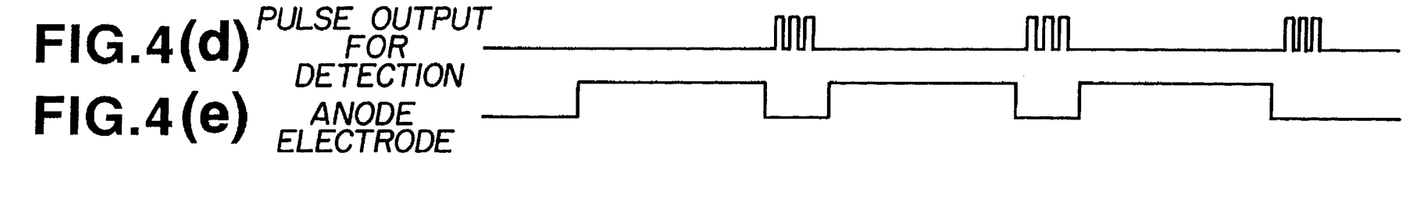
Figure 5:
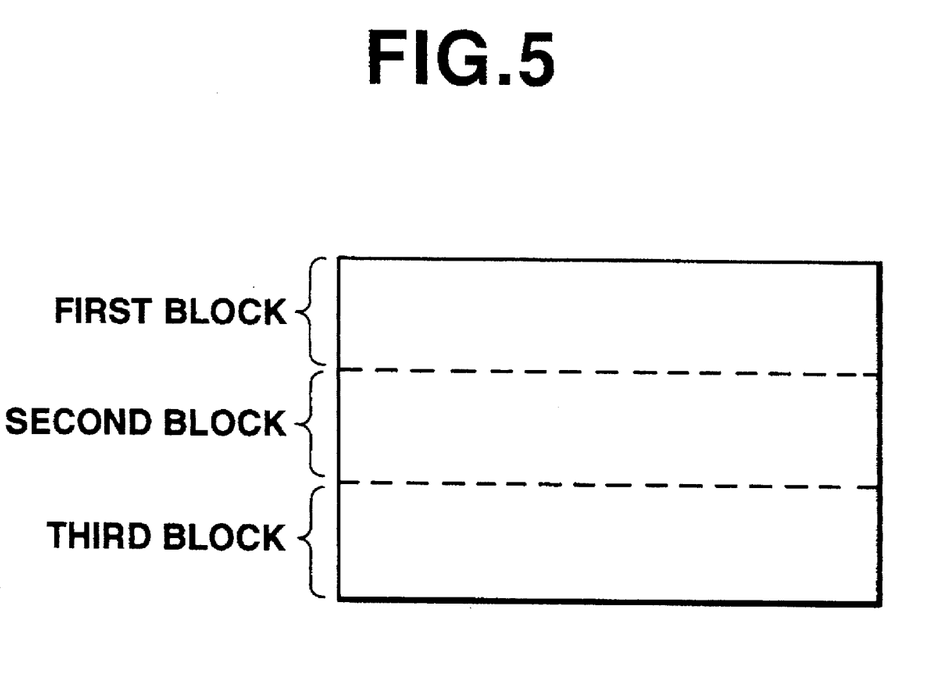
FIG. 5 is a schematic view showing an image which is displayed in the display-integrated tablet device of FIG. 1 while being divided into a plurality of blocks.
Figure 6A:
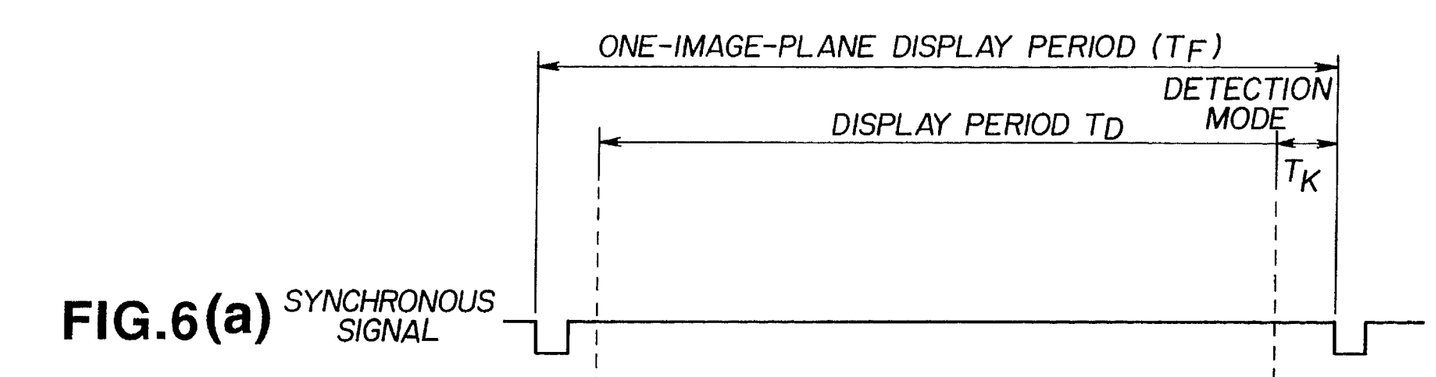
FIG. 6(a) to 6(e) each are a timing chart showing another example of each of an electrode drive timing and a detection pulse generation timing within a one-image-plane display period in the display-integrated tablet device of FIG. 1.
Figure 6B:
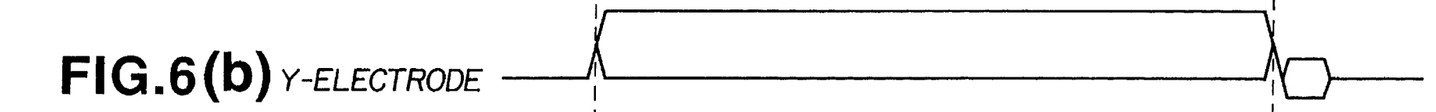
Figure 6C:
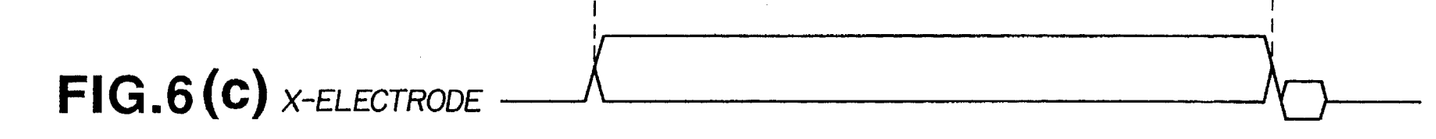
Figure 6D:
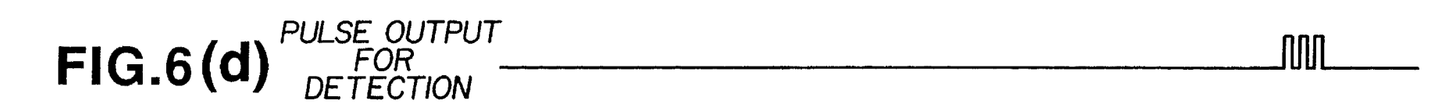
Figure 6E:
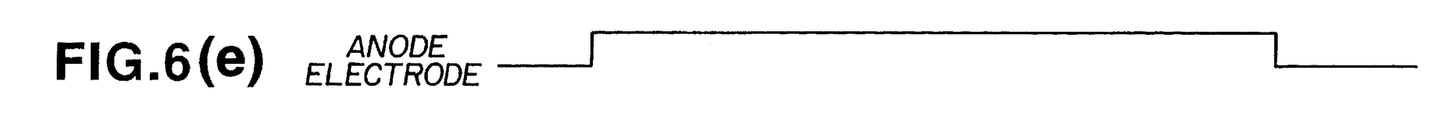

During the first block display period $T_{B1}$, the Y-scan driver 6 and X-scan driver 8 are driven according to control of the driver controller 5 by CPU 4, so that display of the first block section shown in FIG. 5 may be carried out. In the illustrated embodiment, an anode voltage is applied to the anode electrodes 24 for image display, so that the anode electrodes 24 may be driven for every block display period as shown in FIG. 4(e).

Scanning by the Y-scan driver 6 and X-scan driver 8 may be carried out in substantially the same manner as shown in, for example, FIG. 7. More particularly, the Y-scan driver 6 applies a scan voltage to the Y-electrodes $y_1$ to $y_n$ in order, to thereby carry out vertical scanning as shown in FIG. 4(b) and the X-scan driver 8 is driven to apply a voltage corresponding to display data to each of the X-electrodes $x_1$ to $x_m$ during a scan period of each of the Y-electrodes $y_1$ to $y_n$ as shown in FIG. 4(c). Alternatively, the display data may be concurrently fed to the X-electrodes $x_1$ to $x_m$.

Scanning thus carried out permits electrons emitted from the conical emitters to be impinged on the anode electrodes (FIG. 5) positioned at intersections between the X-electrodes $x_1$ to $x_m$ and the Y-electrodes $y_1$ to $y_n$ to which the voltage is applied, so that the phosphor or picture cell of each of the anode electrodes 24 may be excited to emit light, resulting in image display being carried out.

Thus, when scanning of the last Y-electrode $y_n$ (scanning line) is completed in the predetermined first block, the CPU 4 terminates the first block display period $T_{B1}$. Then, operation in the first coordinate detection mode period $T_{K1}$ in the one- image-plane display period $T_F$ is initiated. In the first coordinate detection mode period $T_{K1}$, the X-coordinate scan switch 9 and Y-coordinate scan switch 7 are turned on and the X-coordinate detection switch 16 and Y-coordinate detection switch 14 are turned on. Also, operation of the X-scan driver 6 and Y-scan driver 8 is interrupted. Further, application of a voltage to the anode electrodes 24 is interrupted (FIG. 4(e)).

Then, as shown in FIG. 4(d), the coordinate detection controller 11 is controlled to generate a pulse for detection of a predetermined voltage from the pen point of the stylus pen 12 kept abutted against the tablet 1. This causes a voltage to be induced between the pen point of the stylus pen 12 and the X-electrodes and Y-electrodes due to electrostatic capacity coupling and according to such an electrostatic capacity distribution as described above with reference to FIG. 11. At this time, the X-coordinate detection switch 16 and Y-coordinate detection switch 14 are kept turned on, so that a voltage for each of the X-electrodes $x_1$ to $x_m$ is input to the X-coordinate detection section 15, resulting in being held therein and a voltage for each of the Y-electrodes $y_1$ to $y_n$ is input to the coordinate detection section 13, followed by being held therein.

In the illustrated embodiment, at least the above-described operation is executed during the detection mode period. Thus, it will be noted that the detection mode period indicates a period required for outputting a pulse for detection from the stylus pen 12 to apply a voltage for detection to each of the scan electrodes and carrying out operation of causing the voltage to be taken in the X-coordinate detection switch 15 and Y-coordinate detection switch 13. A period of time for the detection mode period is merely required to be as short as several microseconds.

Supposing that the above-described operation has been executed during the first detection mode period $T_{K1}$, the CPU 4 terminates the first detection mode period and carries out control required for transfer to the second block display period $T_{B2}$. More particularly, the X-coordinate scan switch 9 and Y-coordinate scan switch 7 which are kept turned off are turned on to turn off the X-coordinate detection switch 16 and Y-coordinate detection switch 14 which are kept turned on. Also, a voltage is applied to the anode electrodes 24. Then, control of the X-scan driver 6 and Y-scan driver 8 is carried out so that substantially the same operation as in the first block is initiated from a first one of the Y-electrodes in the second block display range or a Y-electrode next to the last Y-electrode in the first block to restart image display.

Also, in the second block display period $T_{B2}$, operation is carried out for discriminating a coordinate position input based on data on the voltage for every electrode held in each of the X-coordinate display section 15 and Y-coordinate detection display section 13 in the first detection mode $T_{K1}$.

More particularly, at this time, the voltage for detection is kept held in each of the X-coordinate detection section 15 and Y-coordinate detection section 13 even when the X-coordinate detection switch 16 and Y-coordinate detection switch are turned off. Thus, when the X-coordinate detection section 15 and Y-coordinate detection section 13 each are constructed in substantially the same manner as shown in FIG. 2, they operate as described above with reference to FIG. 3, so that X-coordinate peak detection data and Y-coordinate peak detection data are fed to the coordinate detection controller 11.

Then, the coordinate detection controller 11 detects, based on the data fed thereto, an X-coordinate and a Y-coordinate from a timing at which the X-electrode exhibiting a peak voltage was detected and a timing at which the Y-electrode exhibiting a peak voltage was detected, to thereby generate coordinate data, which are then fed to the CPU 4. The CPU 4 then carries out predetermined processing based on the coordinate data.

Then, scanning of a last Y-electrode in the second block is completed to terminate the second block display period $T_{B2}$, followed by transfer to a second detection mode period $T_{K1}$. Also in this instance, switching operation of the switch sections is carried out in substantially the same manner as during the first detection mode period $T_{K1}$, so that data on a voltage generated due to electrostatic capacity coupling for each of the X-electrodes and Y-electrodes are fed to each of the X-coordinate detection section 15 and Y-coordinate detection section 13, followed by being held therein.

Then, operation is transferred to a third block display period $T_{B3}$, so that switching of the switch sections is carried out in substantially the same manner as that in each of the first and second display period $T_{B1}$ and $T_{B2}$ described above and scanning is carried out on the Y-electrodes $y_1$ to $y_n$ in turn, resulting in display for one image pane being completed. Also, during the third block display period, discrimination on a coordinate position input takes place on the basis of a voltage value obtained for each of the X-electrodes and Y-electrodes due to electrostatic capacity coupling during the second detection mode period $T_{K2}$ and in the same manner as the above-described coordinate detection operation in the second block.

Thus, when the third block display period $T_{B3}$ terminates, transfer to a last or third detection mode period $T_{K3}$ in the one-image-plane display period is carried out, so that switching of the switch sections and voltage detection operation take place in substantially the same manner as during the first and second detection mode periods. Discrimination on an input coordinate position based on voltage data for every electrode obtained during the last detection mode period $T_{K3}$ is carried out in a first block display period $T_{B1}$ of the next one-image-plane display period $T_F$.

As described above, the display-integrated tablet device of the illustrated embodiment is so constructed that the actual image display period in the one-image-plane display period $T_F$ is divided into a plurality of blocks and the detection period mode is provide between each adjacent two of the block display periods thus divided, resulting in image display and coordinate detection operation being carried out, so that detection of a coordinate position in the one-image-plane display period $T_F$ may be accomplished several times.

The conventional display-integrated tablet device, as shown in FIG. 9, is constructed so that the stylus pen detects a voltage. Such construction requires a period for scanning the Y-coordinate and X-coordinate for coordinate detection which is as long as about 700 ms, resulting in increasing a display interruption period in the one-image-plane display period $T_F$, leading to a disadvantage that the actual image display period is disadvantageously reduced.

On the contrary, the illustrated embodiment eliminates a necessity of electrode scanning for coordinate detection. Also, the illustrated embodiment permits generation of the pulse for detection from the stylus pen 12 to be carried out during each of the detection mode periods and merely requires a length of time sufficient to feed a voltage induced between the electrode and the stylus pen 12 due to electrostatic capacity coupling based on the thus-generated pulse to the X-coordinate detection switch 15 and Y-coordinate detection switch 13. Therefore, the illustrated embodiment permits a display interruption period in the one- image-plane display period $T_F$ to be substantially reduced, resulting in an increase in image display period, leading to an increase in luminance of an image displayed.

Also, the conventional display-integrated tablet device fails to set a plurality of coordinate detection periods in a one-image-plane display period. On the contrary, the illustrated embodiment permits the display interruption period to be significantly reduced as compared with the prior art irrespective of the fact that a plurality of the detection mode periods are set, because each of the detection mode periods is as short as several microseconds. Thus, for example, supposing that the one-image-plane display period $T_F$ is set to be about 1/60 second, even setting of the number of detection mode periods sufficient to realize a coordinate detection speed of 1/120 second or more required for recognition of letter input permits an influence of luminance or the like on an image displayed to be disregarded.

Further, in the illustrated embodiment, one image plane is divided into three block display periods and the detection mode period is provided for every block display period. Alternatively, the embodiment may be so constructed that one image plane may be divided into two block display periods and the detection mode period is provided for every block display period.

In addition, the illustrated embodiment, as shown in FIG. 6, may be constructed in such a manner that display for one frame (or one field) is continuously carried out by one display period $T_D$ without dividing the one-image-plane display period $T_F$ into the block display periods and the detection mode period $T_K$ is set before or after the display period. Such construction likewise permits the actual display period to be substantially increased as compared with the prior art shown in FIG. 10.

The circuit structure of the display-integrated tablet device of the illustrated embodiment is merely an example, therefore, many variations are possible so long as they exhibit like advantages. For example, in the illustrated embodiment, the FED is used as the tablet 1. Alternatively, a display device of another structure which can carry out coordinate detection due to electrostatic capacity coupling may be effectively applied to the present invention. For example, incorporation of such an ELD as used in the prior art shown in FIG. 9 in the present invention permits it to exhibit like advantages.

Furthermore, the number of actual display periods divided in the one-image-plane display period $T_F$ may be set as desired depending on conditions under which the device is applied. When the device is used under the conditions that the number of times of detection in the one-image-plane display period $T_F$ is merely required to be two even when it is divided into three such block display periods, the detection mode following the third block may be eliminated.

Moreover, in the illustrated embodiment, the X-coordinate scan switch 9 and Y-coordinate scan switch 7 and the X-coordinate detection switch 16 and Y-coordinate detection switch 14 are arranged for on/off-operation. Alternatively, the switches 9 and 7 and the switches 16 and 14 may be incorporated in the X-scan driver 8 and Y-scan driver 6 and the X-coordinate detection section 5 and Y-coordinate detection section 13, respectively.

As can be seen from the foregoing, the display-integrated tablet device of the present invention is so constructed that the conductor for detection (stylus pen) generates a pulse for detection during the detection mode to input a voltage induced due to electrostatic capacity coupling to the X-coordinate detection section and Y-coordinate detection section for the temporary holding therein, to thereby carry out coordinate detection based on a voltage value held in each of the X-coordinate detection section and Y-coordinate detection section during the image display period. Such construction permits a display interruption period during the one-image-plane display period to be substantially reduced, resulting in the actual display period being significantly increased, leading to an improvement in luminance of an image displayed.

Also, in the present invention, the scan-side switch sections for connecting the X-scan driver with the X-electrodes and connecting the Y-scan driver with the Y-electrodes, as well as the detection-side switch sections for connecting the X-coordinate detection section with the X-electrodes and connecting the Y-coordinate detection section with the Y-electrodes are provided, so that the scan-side switches and detection-side switch sections are turned on and turned off during the detection mode period, respectively. This results in effectively preventing erroneous coordinate detection due to input of a scan pulse for display to the coordinate detection section.

Further, the present invention may be constructed in the manner that the actual image display period in the one-image-plane display period is divided into a plurality of block display periods and the detection mode period is allocated before or after each of the block display periods. Such construction permits a speed at which coordinate detection is carried out to be increases without deteriorating luminance of an image displayed, resulting in coordinate detection for letter recognition being readily accomplished with increased accuracy.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A display device integrated tablet device comprising:
   a tablet having a plurality of X-electrodes and Y-electrodes arranged in a matrix-like manner and including a display plane;
   an X-electrode drive means for driving said X-electrodes at a predetermined timing;
   a Y-electrode drive means for driving said Y-electrodes at a predetermined timing;
   a coordinate input means for generating a coordinate location signal for detecting a tablet coordinate of said tablet;
   an X-coordinate detection signal holding means, connected to said X-electrodes, and arranged for temporarily holding X-reception signals generated in said X-electrodes by said coordinate location signal;
   a Y-coordinate detection signal holding means, connected to said Y-electrodes, and arranged for temporarily holding Y-reception signals generated in said Y-electrodes by said coordinate location signal;
   a coordinate detection means, coupled to said X-coordinate detection signal holding means and said Y-coordinate detection signal holding means, to which said X-reception signals and X-electrode position data and said Y-reception signals and Y-electrode position data are input, for determining an X-coordinate and a Y-coordinate at which there is a maximal value of said X-reception signals and said Y-reception signals; and a control means for controlling said X-electrode drive means and said Y-electrode drive means during an image display period, so as to permit an image display to be carried out on said display plane of said tablet and so as to permit said coordinate input means to generate said coordinate location signal during a coordinate detection period, resulting in said X-reception signals and said Y-reception signals being received and held by said X-coordinate detection signal holding means and said Y-coordinate detection signal holding means, respectively.

2. A display-integrated tablet device as defined in claim 1, wherein said display plane of said tablet is divided into two or more display regions, in correspondence to which block display periods are set; and a detection mode period is set before or after each of said block display periods.

3. A display-integrated tablet device as defined in claim 1 or 2, further comprising a switching means for connecting said X-electrodes and said Y-electrodes to said X-electrode drive means and said Y-electrode drive means, respectively, during said image display period, and for connecting said X-electrodes and said Y-electrodes to said X-coordinate detection signal holding means and said Y-coordinate detection signal holding means during said coordinate detection period, respectively.

4. A display-integrated tablet device according to claim 1, wherein said coordinate input means comprises a pen.

5. A device according to claim 4, wherein said coordinate input means comprises means for providing a voltage to said pen.

* * * * *